US007446897B2

(12) United States Patent
Longrod

(10) Patent No.: US 7,446,897 B2
(45) Date of Patent: Nov. 4, 2008

(54) TRANSACTIONAL PRINTER WITH SLIP PROCESSING MECHANISM

(75) Inventor: Scott J. Longrod, Lansing, NY (US)

(73) Assignee: Axiohm Transaction Solutions, Inc., Ithaca, NY (US)

( * ) Notice: Subject to any disclaimer, the term of this patent is extended or adjusted under 35 U.S.C. 154(b) by 1288 days.

(21) Appl. No.: 10/408,159

(22) Filed: Apr. 4, 2003

(65) Prior Publication Data

US 2004/0197128 A1 Oct. 7, 2004

(51) Int. Cl.
*G06K 1/00* (2006.01)
*H02P 1/00* (2006.01)

(52) U.S. Cl. ........................ 358/1.3; 358/1.2; 318/280; 318/284

(58) Field of Classification Search ................. 358/1.3, 358/1.2; 318/280, 284; 101/38.1
See application file for complete search history.

(56) References Cited

U.S. PATENT DOCUMENTS 5,749,277 A * 5/1998 Walker ........................ 83/563
5,768,675 A * 6/1998 Estabrooks ................. 399/385
5,974,930 A * 11/1999 Longrod ...................... 83/629
6,405,625 B1 * 6/2002 Nomura et al. ............... 83/618
6,408,727 B1 * 6/2002 Harris et al. .................. 83/566
6,504,331 B1 * 1/2003 Longrod ..................... 318/280
6,561,419 B1 * 5/2003 Koizumi et al. ............. 235/449

* cited by examiner

*Primary Examiner*—Houshang Safaipour
(74) *Attorney, Agent, or Firm*—George R. McGuire; David L. Nocilly; Bond Schoeneck & King, PLLC

(57) ABSTRACT

A transactional printer having a wheel interconnected to a knife cutting assembly for frictionally engaging a severed slip and ejecting it into a receiving bin. The wheel is moved out of engagement with an ejected slip during the cutting operation of the knife. As the knife blade is restored to its pre-cut position, the wheel is moved into engagement with the slip and rotated to eject the slip into the bin. A depression in the printer housing prevents contact between the housing and the wheel when the wheel is in frictional engagement with a slip. A stop interconnected to the wheel prevents contact between the wheel and the depression.

6 Claims, 6 Drawing Sheets

TRANSACTIONAL PRINTER WITH SLIP PROCESSING MECHANISM

BACKGROUND OF THE INVENTION

1. Field of Invention

The present invention relates generally to printers, and more particularly, to a slip processing mechanism system for cutting, ejecting and stacking slips.

2. Description of Prior Art

In a transaction printer, such as a conventional point-of-sale printer, a paper web is typically unwound from a continuous supply roll and receipt information is printed thereon by any number of printing processes, such as dot impact or thermal printing. After printing, the printer mechanism advances the receipt portion of the web out of the printer housing and a knife severs the receipt. Printed receipts may then by removed from the printer and given to a consumer with photocopies or electronic copies or saved for record-keeping purposes. As the manual removal of a receipt after each printing operation is time consuming, users desiring to save copies of receipts often allow multiple slips to accumulate on the printer. Previously printed receipts often interfere with or hamper the ejection of subsequently printed receipts. Additionally, printed receipts often become intermingled, thus destroying the chronological continuity of the stacked receipts.

Complex stacking mechanisms, such as multiple stacking trays, have been used to maintain stored receipts are in chronological order. These devices are bulky and complex, however, and unnecessarily increase the cost of the printers. Some printers use what are referred to in the art as "slip kickers" for ejecting a cut slip from the printer. Conventional slip kickers require numerous moving parts, require independent drive mechanisms, and do not necessarily insure the chronology of receipts after ejection.

3. Objects and Advantages

It is a principal object and advantage of the present invention to provide a simple and inexpensive way to process slips ejected from a printer.

It is an additional object and advantage of the present invention to maintain accumulated slips in chronological order.

It is a further object and advantage of the present invention to provide a simple and inexpensive means to stack and store ejected slips.

Other objects and advantages of the present invention will in part be obvious, and in part appear hereinafter.

SUMMARY OF THE INVENTION

The present invention is a transactional printer and slip processing mechanism comprising a slip roller and knife assembly interconnected to the printer motor for frictionally engaging a severed slip and ejecting it into a receiving bin after a printing operation. Concurrently with the motor driving a knife arm to operate the knife assembly, a slip roller is moved out of engagement with the slip. When the motor restores the knife assembly blade back to its pre-cut position, the slip roller moves into frictional engagement with the slip and rotates to eject the slip into the bin. A depression in the outer surface of the printer housing cooperates with the slip roller to facilitate frictional engagement with the slip. A stop prevents direct contact between the housing and the slip roller when a slip is not present in the slip processing mechanism.

DETAILED DESCRIPTION

Figure 1A:
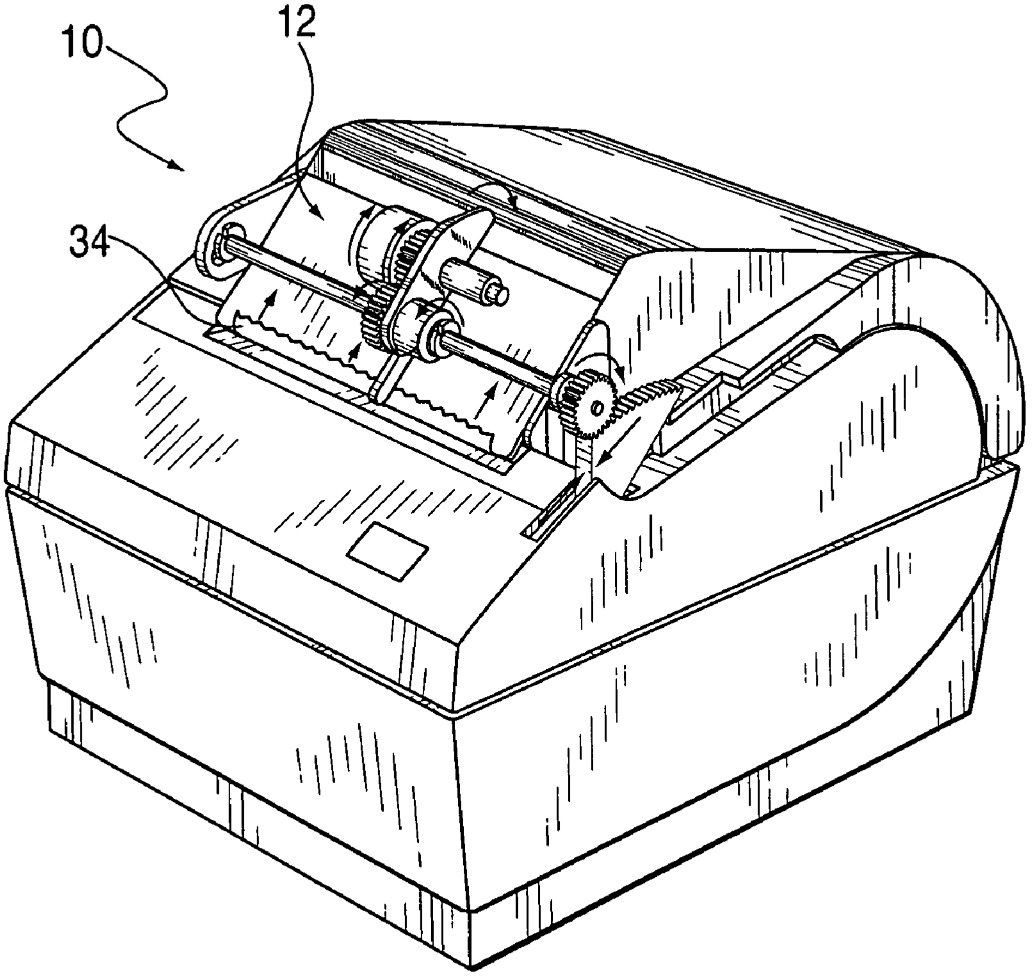
FIGS. 1A and 1B are perspective views of the present invention illustrating a slip in pre-cut and post-cut processing positions, respectively.
Figure 1B:
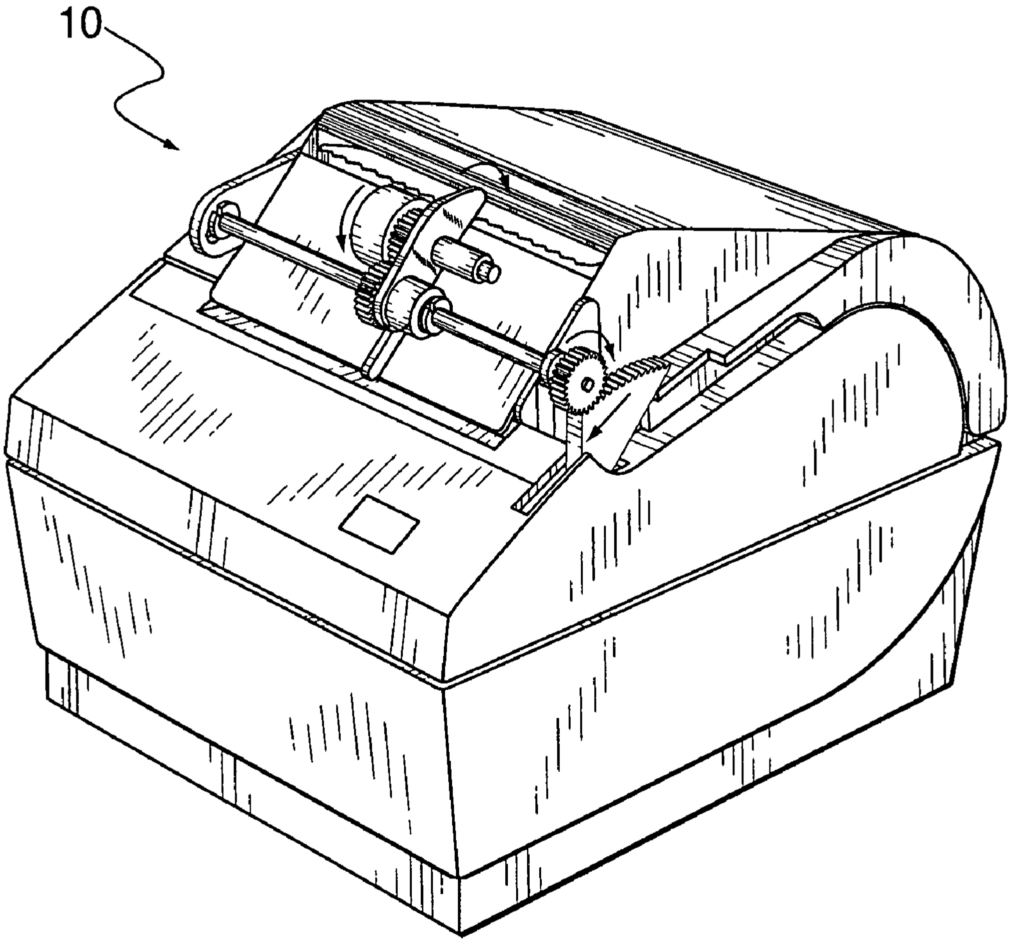
Figure 3:
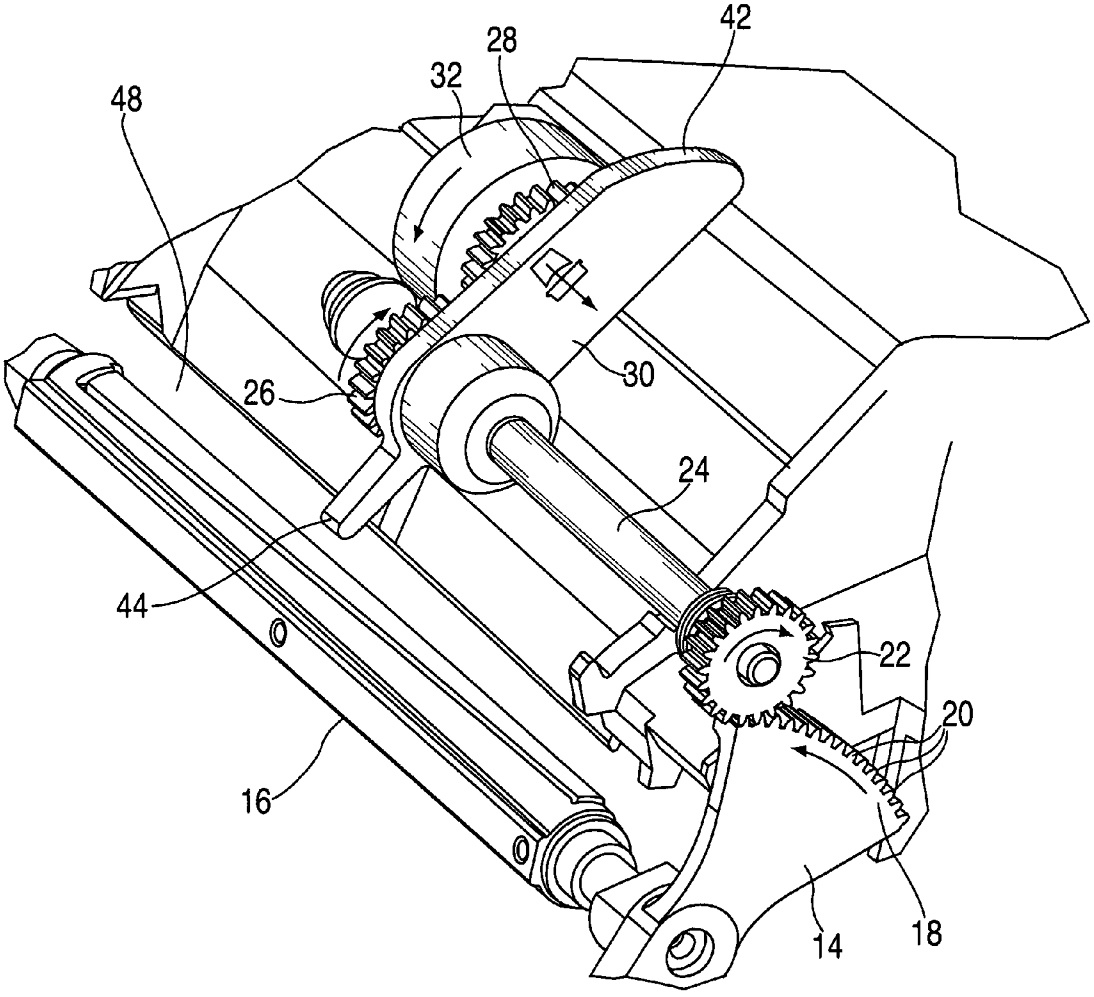
FIG. 3 is an enlarged, partial cut-away perspective of the slip processing mechanism of the present invention.

Referring now to the drawing in which like reference numerals refer to like parts throughout, there is seen in FIGS. 1A and 1B, a printer 10 having a slip processing mechanism 12 according to the present invention for ejecting a slip 34. As seen in FIG. 3, slip mechanism 12 comprises a knife arm 14 attached to the end of a rotating knife 16 for severing slips from a continuous feed roll (not shown). Knife arm 14 further comprises a row of gear teeth 20 contained at extending end 18. Gear teeth 20 mesh with a kicker shaft pinion 22 mounted on the end of a kicker shaft 24. An intermediate portion of kicker shaft 24 supports a kick shaft gear 26 that engages a slip roller gear 28 mounted on a toggle arm 30. Toggle arm 30 is pivotally mounted to kicker shaft 24 and may optionally contain a rearward protrusion 44 that is in a position that prevents excessive clock-wise motion of the toggle arm 30. Slip roller gear 28 is mounted to a slip roller 32 that is preferably composed of a rubber-like, or a similar substance that effecting frictionally grips slip 34.

Printer 10 further comprises a housing 36 that defines a slot 48 through which slip 34 extends prior to severing by knife 16. Housing 36 extends underneath slip mechanism 12 and terminates in a receipt bin 38 for capturing slips 34 after ejection by slip mechanism 12. Bin 38 is dimensioned to accept any conventionally sized slip 34 printed by printer 10, and is positioned vertically below slip mechanism 12 so that gravity causes a severed slip 34 to drop therein.

Figure 4:
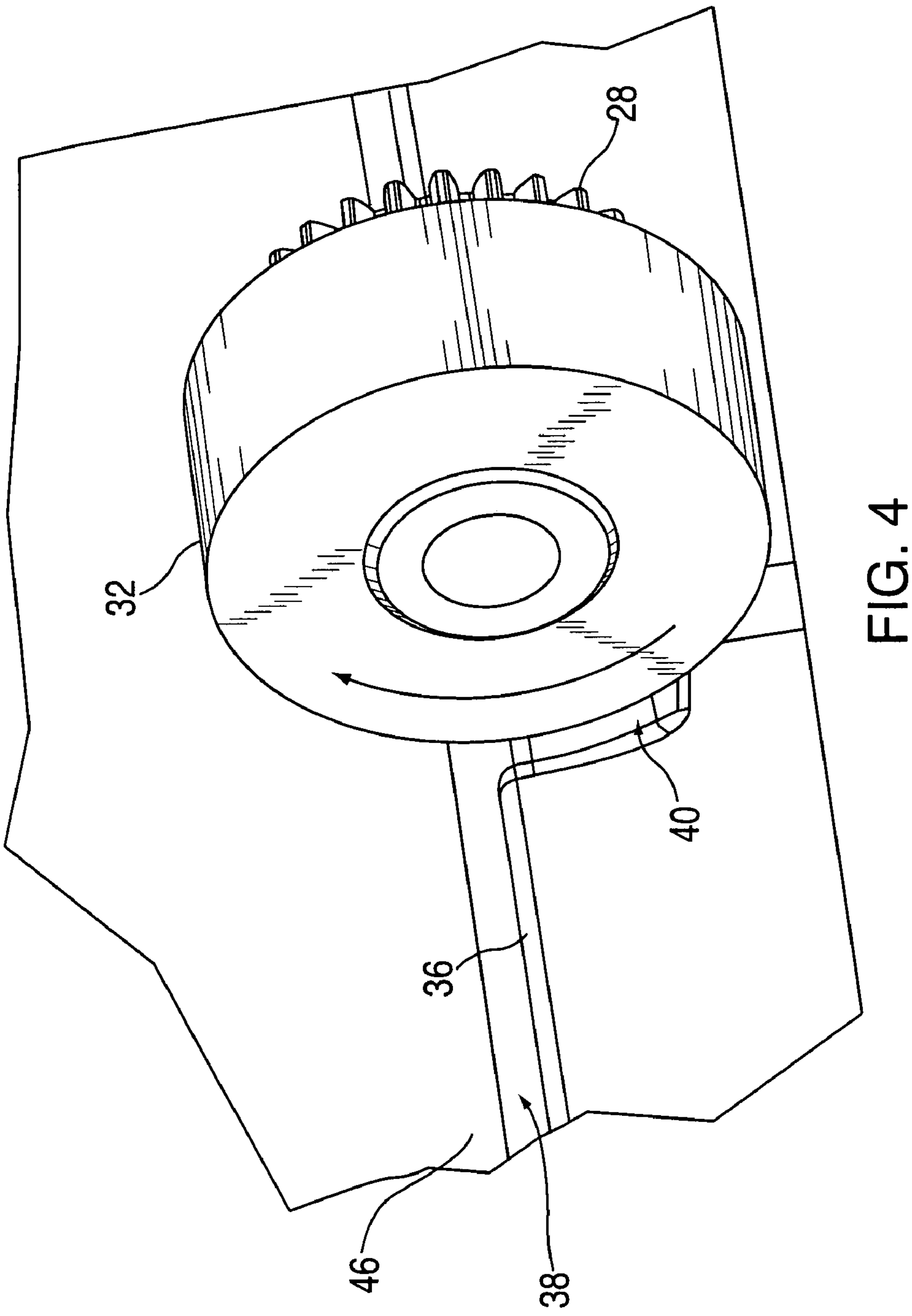
FIG. 4 is an enlarged partial cut-away perspective of the slip roller of the present invention.

As seen in FIG. 4, housing 36 defines a concave depression 40 correspondingly sized and positioned for engagement with slip roller 32 at the edge of bin 38. Tension created in slip 34 at depression 40 by its interface with slip roller 32 supplies additional motive energy to assist in moving slip 34 past housing 36 and into bin 38.

Figure 2A:
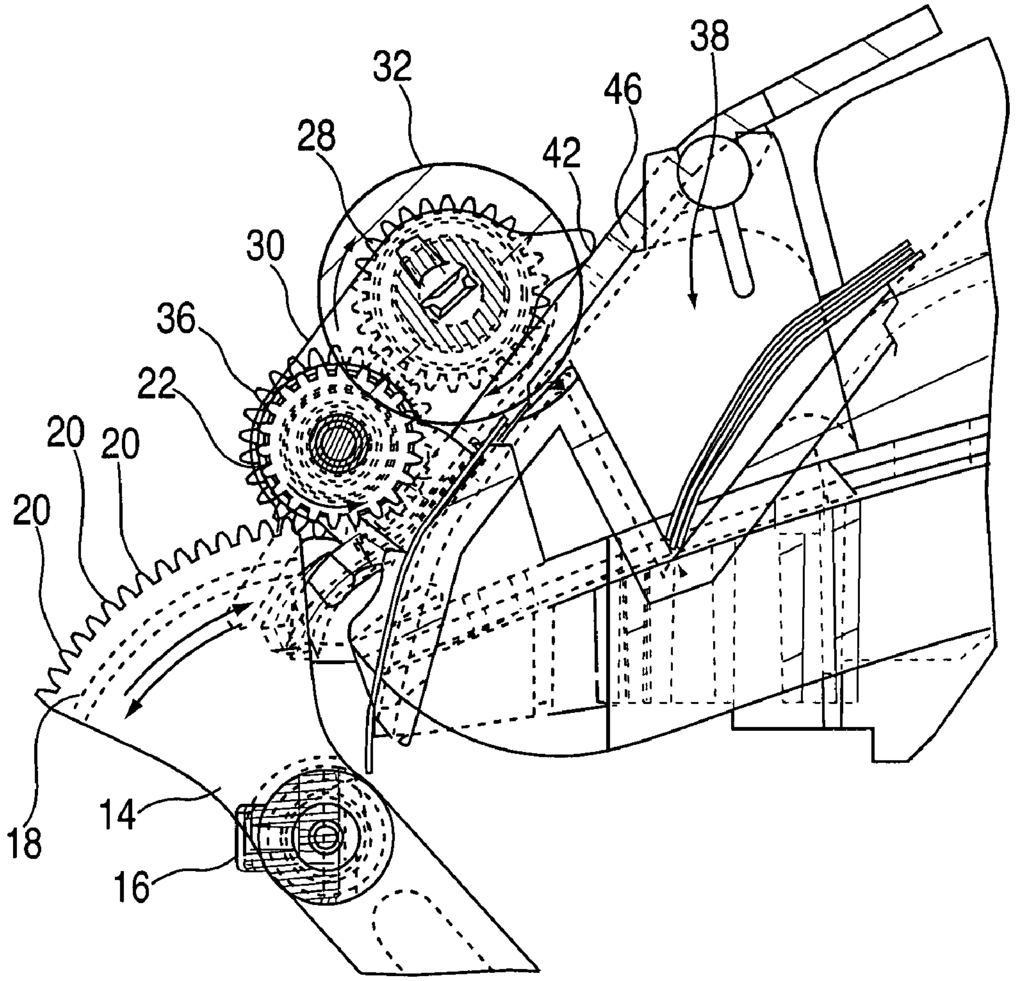
FIGS. 2A and 2B are sectional side elevation views illustrating the slip processing mechanism of the present invention in pre-cut and post-cut processing positions, respectively.
Figure 2B:
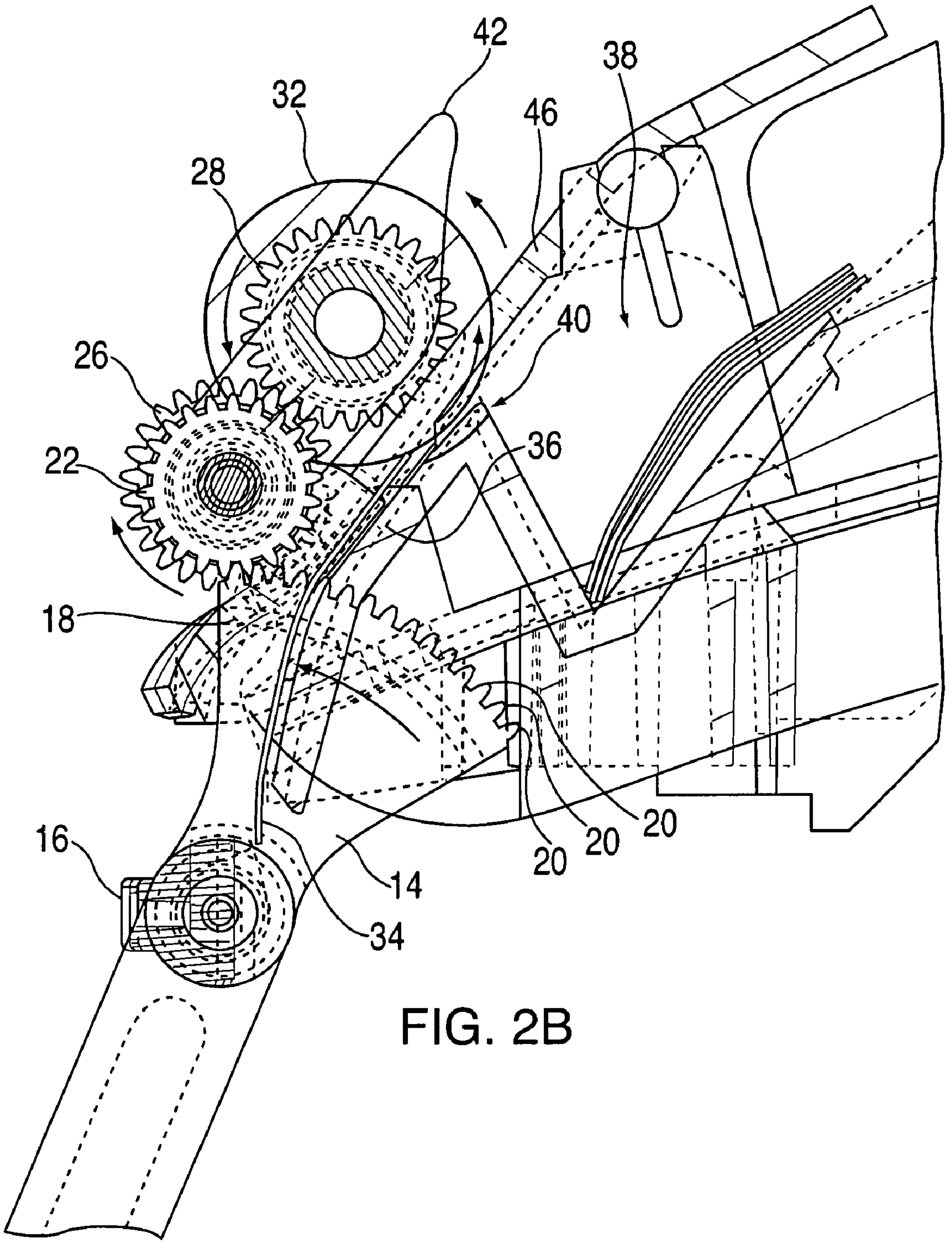

As seen in FIGS. 2A, 2B, and 3, toggle arm 30 contains a stop 42 that engages a cover 46 positioned over bin 38 when toggle arm 30 is in its terminal clockwise position. Stop 42 insures that a gap exists between slip roller 32 and depression 40 to prevent direct contact between the frictional surface of slip roller 32 and depression 40, which could stall the printer motor if slip 34 is no longer beneath slip roller 32.

As best seen in FIGS. 2A and 2B, slip mechanism 12 operates between a pre-cut position and a post-cut position, respectively. During printing of slip 34, slip mechanism 12 is in its pre-cut position as shown in FIG. 2A. The conventional printing mechanism (not shown) within printer 10 feeds slip 34 past knife 16 and through slot 48 until it extends between housing 36 and slip mechanism 12. When printing is complete, printing mechanism 12 advances slip 34 a predetermined distance to insure that all information printed on slip 34 has passed beyond knife 16 and the printer motor (not shown) actuates the knife 16 to sever the slip 34. Knife arm 14 then pivotally moves from the terminal position shown in FIG. 2A to the terminal position shown in FIG. 2B, resulting in the clockwise rotation of knife 16 to sever slip 34. The movement of knife arm 14 between its terminal positions effects counterclockwise rotation of pinion 22 through the engagement of teeth 20 with the pinion. Although the counterclockwise rotation of pinion 22 causes kick shaft gear 26 to drive slip roller 32 clockwise (and thus opposite to the intended direction of slip 34), the counterclockwise pivoting of toggle arm 30 on kicker shaft 24 lifts kick roller 32 out of engagement with slip 34. When cutting is complete, slip mechanism 12 is in the position shown in FIG. 2B.

Ejection of slip 34 begins with the pivoting of knife arm 14 counterclockwise from the post-cut terminal position (shown in FIG. 2B) to the pre-cut terminal position (shown in FIG. 2A), thereby causing teeth 20 to drive pinion 22 clockwise. As a result, shaft 24 also rotates clockwise, thereby lowering toggle arm 30 so that slip roller 32 engages slip 34. The rotation of shaft 24 also results in the clockwise rotation of kick shaft gear 26, causing slip roller 32 to rotate counterclockwise and drive slip 34 forward into bin 38. Slip roller 32 drives slip 34 along housing 36 until the trailing edge of slip 34 reaches depression 40, freeing slip 34 to drop into receipt bin 38. It should be understood by one of ordinary skill in the art that knife arm 14 must pivot through a sufficient distance to result in slip 34 being driven by slip roller 32 far enough so that the trailing edge of slip 34 reaches depression 40 and slip 34 can drop into bin 38. Successive slips 34 severed and ejected in the manner described above successively drop into bin 38 and are maintained in the chronological order in which they were printed.

What is claimed is:

1. A transaction printer for processing a slip, comprising:

a housing;

severing means mounted within said housing;

an arm having first and second ends pivotally mounted to said severing means, wherein said second end includes a plurality of teeth;

a shaft rotatably mounted to said housing and interconnected to said second end of said arm by a pinion; and a wheel interconnected to said shaft for frictionally engaging said slip in response to pivotal movement of said arm.

2. The transaction printer of claim 1, wherein said housing includes a depression positioned adjacent to said wheel.

3. The transaction printer of claim 2, further comprising a stop interconnected to said wheel for engagement with said housing.

4. The transaction printer of claim 1, wherein said wheel is mounted on a support pivotally interconnected to said arm for moving said wheel into and out of engagement with said slip.

5. The transaction printer of claim 4 further comprising a stop on said support that engages said housing, whereby said stop prevents said wheel from contacting said depression when said slip is not engaged by said wheel.

6. The transaction printer of claim 4, wherein said support pivots said wheel out of engagement with said slip when said arm pivots to activate said severing means and said support pivots said wheel into engagement with said slip when said aim pivots to restore said severing means.

* * * * *

UNITED STATES PATENT AND TRADEMARK OFFICE

CERTIFICATE OF CORRECTION

PATENT NO. : 7,446,897 B2
APPLICATION NO. : 10/408159
DATED : November 4, 2008
INVENTOR(S) : Scott J. Longrod It is certified that error appears in the above-identified patent and that said Letters Patent is hereby corrected as shown below:

Col. 4, Claim 6, line 30, please delete “aim” and insert --arm--

Signed and Sealed this

Seventeenth Day of February, 2009

JOHN DOLL
*Acting Director of the United States Patent and Trademark Office*